(12) United States Patent
Vennelakanti et al.

(10) Patent No.: US 7,970,143 B2
(45) Date of Patent: Jun. 28, 2011

(54) SYSTEM, METHOD AND APPARATUS TO OBTAIN A KEY FOR ENCRYPTION/DECRYPTION/DATA RECOVERY FROM AN ENTERPRISE CRYPTOGRAPHY KEY MANAGEMENT SYSTEM

(75) Inventors: Ravigopal Vennelakanti, Bangalore (IN); Savio Fernandes, Margao (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 742 days.

(21) Appl. No.: 11/996,972

(22) PCT Filed: Aug. 5, 2005

(86) PCT No.: PCT/IN2005/000259
§ 371 (c)(1),
(2), (4) Date: Jan. 28, 2008

(87) PCT Pub. No.: WO2007/017884
PCT Pub. Date: Feb. 15, 2007

(65) Prior Publication Data
US 2008/0232598 A1    Sep. 25, 2008

(51) Int. Cl.
*H04L 9/00* (2006.01)
(52) U.S. Cl. ...................................................... 380/277
(58) Field of Classification Search .................... None
See application file for complete search history.

(56) References Cited

U.S. PATENT DOCUMENTS

| 2001/0005346 | A1* | 6/2001 | Sako et al. ................ 369/53.35 |
| 2003/0021417 | A1 | 1/2003 | Vasic et al. |

FOREIGN PATENT DOCUMENTS

| EP | 0891055 A2 | 1/1991 |
| EP | 0752663 A1 | 1/1997 |

* cited by examiner

Primary Examiner — Brandon S Hoffman

(57) ABSTRACT

A technique for obtaining a key for encryption/decryption/data recovery from an enterprise key management system. In one example embodiment, this is accomplished by connecting a client mobile device to a cryptography key management using a UID, a UDID, the names of one or more data files to encrypt, a password Pswd, and a KeyID to obtain the key for encryption/decryption/data recovery.

18 Claims, 3 Drawing Sheets

SYSTEM, METHOD AND APPARATUS TO OBTAIN A KEY FOR ENCRYPTION/DECRYPTION/DATA RECOVERY FROM AN ENTERPRISE CRYPTOGRAPHY KEY MANAGEMENT SYSTEM

FIELD OF THE INVENTION

This invention relates to the field of cryptography mechanisms, and more specifically to a system, method and apparatus for obtaining encryption/decryption/data recovery key from an enterprise cryptography key management system for mobile devices.

BACKGROUND OF THE INVENTION

To ensure data security on devices for local storage, several pointed solutions are available that rely on proven encryption and decryption mechanisms. Standard security practices recommend that the keys used for encryption and decryption should not be stored along with the encrypted data. This is akin to locking a door with a strong lock and leaving the key under the doormat.

Also, a user may use multiple keys to encrypt different pieces of data. Managing these keys can become very difficult when the number of keys used to encrypt the different pieces of data significantly increases.

Furthermore, standard security practices require that the keys used for encryption and decryption should be changed periodically. In such a case, the data encrypted by previous keys should be recoverable and the integrity of data should still be maintainable. The keys required for decryption of data may get lost or corrupted. In which case there would be no way of recovering the encrypted data.

Organizations require that access to sensitive corporate data stored in encrypted format should be recoverable (decrypted) by authorized personnel other than the entity who may have encrypted the data. This requirement arises from the fact that an entity may leave the organization. In such a case the data encrypted by that entity should still be recoverable by authorized personnel such as an administration/organization or a government.

Conventional solutions for key escrow and distribution are largely targeted towards systems, such as desktops, servers, storage devices, and other such fixed machines, which are protected within the periphery of the corporate firewall. These systems generally have sufficient processing capabilities, power/energy resources and capabilities to comply with the corporate security policies. In addition, these systems are physically protected within the corporate periphery.

However, these conventional solutions are not adequate to address the security and integrity needs of mobile computing devices like laptops, personal digital assistants (PDAs), tablet computers and mobile media like flash cards. Mobile devices and media are exposed to security threats, which are not common to fixed systems. They do not lie within the periphery of the enterprise; hence it is difficult to mandate and audit them to adhere to corporate security and firewall policies.

In addition, portable computing devices and mobile media are vulnerable to theft, thereby increasing the likelihood of exposing sensitive files. Storing laptop data in a cryptographic file system does not fully address the problem. Such systems ask the user to imbue them with long-term authority for decryption, but that authority can be used by anyone who physically possesses the machine.

Furthermore, mobile devices have limited computing and battery power and hence solutions that rely on public keys may prove to be computationally expensive. Not all mobile devices support industry standard key-lengths, such as 128 bit and above for symmetric encryption and 512 bit and above for asymmetric key encryption.

One conventional technique uses a Public Key Infrastructure (PKI) based solution, which mostly depends on X.509 Digital Certificates, Certification Authority, CA and PKI. These solutions typically rely on asymmetric keys for mutual authentication, which can require large processing capabilities and mandate the requirement of a PKI. Therefore, these solutions can result in not being very cost effective. Moreover, the certificates used in PKI are not customized with extensions to accommodate the requirements of mobile devices, like unique device identifier, device capability credentials and so on.

Another conventional technique relies on using trusted escrow agents that require manual intervention. Such solutions are generally not feasible in an enterprise with a large number of mobile device deployments. Further, these solutions tend to be slow and non-adaptive.

The above techniques rely heavily on role based access control to restrict/allow access to corporate data. Such techniques have control over who is viewing the data, but they do not have any control over where the data is being accessed. For example, based on use and domain credential an authorized user can access enterprise data from a desktop, laptop or PDA. While this addresses convenience of data being accessed any time, anywhere, there are serious security threats to be concerned about when dealing with mobile devices. The security capabilities of mobile devices are generally inferior when compared with the security capabilities of fixed devices. In addition, current corporate security policies and firewalls do not provide adequate control over mobile devices.

SUMMARY OF THE INVENTION

According to an aspect of the present subject matter, there is provided a method for obtaining a cryptography key for encryption/decryption/data recovery from an enterprise key management system, the method including the steps of using a unique user identifier (UID), a unique device identifier (UDID), names of one or more data files to encrypt/decrypt, and a password (Pswd) to obtain a cryptography key for encryption/decryption.

DETAILED DESCRIPTION OF THE INVENTION

Figure 1:
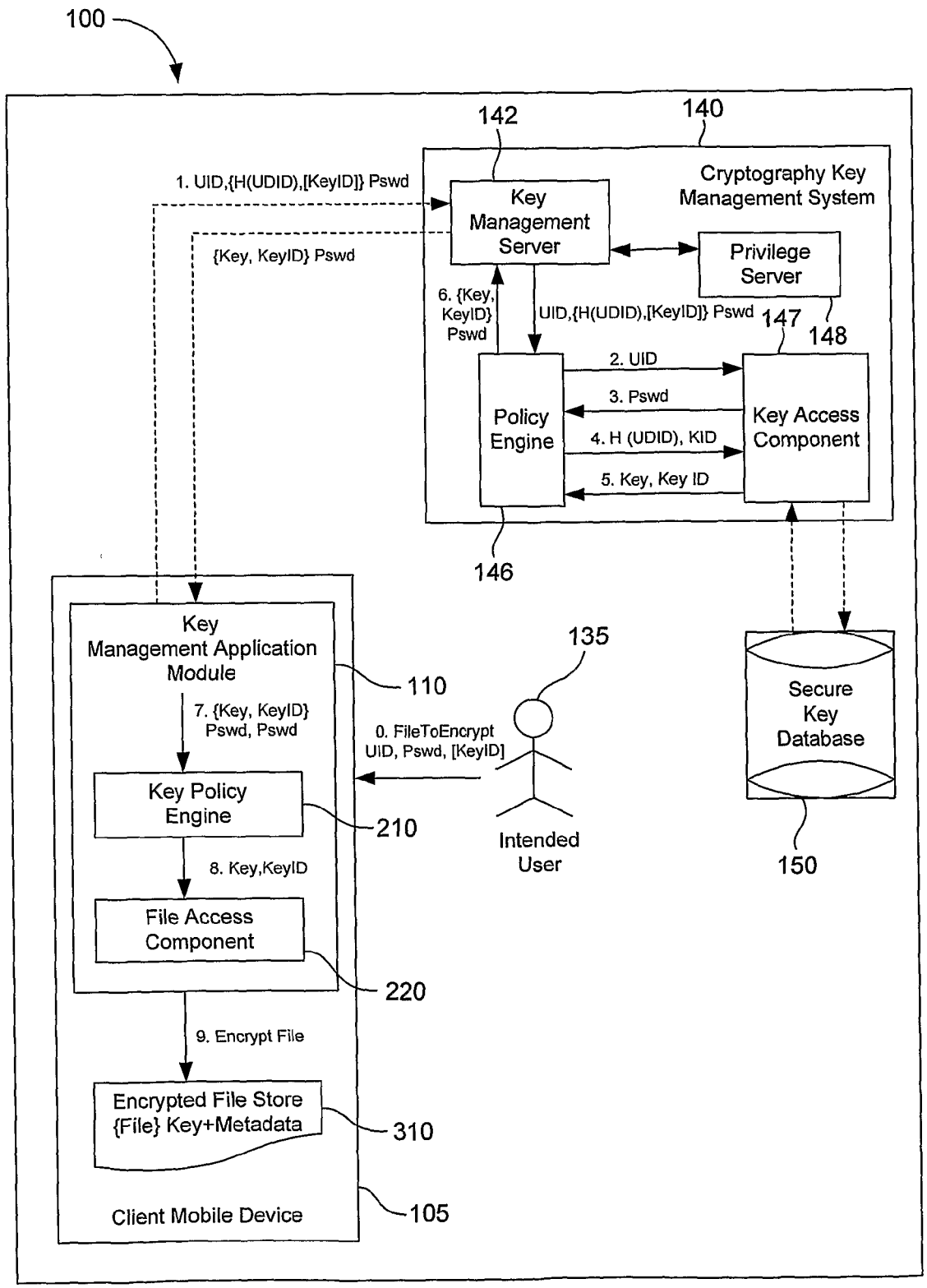
FIG. 1 is block diagram that illustrates a mechanism used to obtain a key for encryption in an enterprise according to an embodiment of the invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The abbreviation "UID" refers to a unique user identifier. The abbreviation "UDID" refers to a unique device identifier. The abbreviation "H(UDID)" refers to a hash of UDID. The abbreviation "Pswd" refers to a password or authentication credentials or a shared secret. The abbreviations "NewPswd" and "NPswd" both refer to a new password. The abbreviation "Key Escrow" refers to a mechanism to safely and reliably store and retrieve a cryptography key with a trusted entity for encryption and decryption of data. The abbreviation "KeyID/KID" refers to a key identifier. The abbreviation "KEC" refers to a key escrow component. The abbreviation "KMS" refers to a key management server. The abbreviation "PE" refers to a policy engine. The abbreviation "KAC" refers to a key access component. The abbreviation "Key" refers to a cryptography key used for encryption and decryption of data, and is also referred to as "data recovery key". The abbreviation "{H(UDID)} Pswd" refers to a password-encrypted H(UDID). The abbreviation "{KeyID} Pswd" refers to a password-encrypted KeyID. The abbreviation "{H(UDID), KeyID}Pswd" refers to a password-encrypted H(UDID) and KeyID. The abbreviation "{Key, KeyID} Pswd" refers to a password-encrypted Key and KeyID. The abbreviation "{H(UDID), Key, [KeyID]} Pswd" refers to a password-encrypted H(UDID), Key, KeyID combination.

The term "KeyID is optional" defines the requirement that KeyID may be specified optionally in the mechanism to obtain a key for encryption if a specific key is desired for encryption. If not the Key ID is used and a new key will be generated and sent to the client for encryption. The abbreviation "{Key}Pswd" refers to a password-encrypted key. The abbreviation "DPswd" refers to a default password. The abbreviation "{Pswd} DPswd" refers to a password-encrypted by default password. The abbreviation "(Clear Text)" refers to unencrypted data.

The term "desired operation" refers to all authorized operations that can be performed by an authenticated user with the cryptography key management system. Exemplary desired operations include, obtaining a cryptography key for encryption, obtaining a cryptography key for decryption and the like. The terms "administrator", "system administrator" and "system admin" are used interchangeably throughout the document. The terms "key management system" and "cryptography key management system" is used interchangeably throughout the document.

The proposed technique provides a key escrow and key distribution mechanism that addresses security needs of mobile devices. The proposed security mechanism addresses the security based on principles of security, such as authentication, authorization, confidentiality, integrity, and non-repudiation.

Referring now to FIG. 1, there is illustrated an example embodiment for obtaining a key for encryption. The enterprise cryptography key management system shown in FIG. 1 includes a client mobile device 105, intended user 135, cryptography key management system 140, and a secure key database 150 coupled to the cryptography key management system 140. Furthermore as shown in FIG. 1, the cryptography key management system 140 includes a key management server 142, a privilege server 148, a policy engine 146, and a key access component 147. Further as shown in FIG. 1, the client mobile device 105 includes a key management application module 110 that includes a key policy engine 210, a file access component 220, and an encrypted file store 310 that is coupled to the key management application module 110, and is relevant to the example technique of obtaining a key for encryption.

In operation, the key management application module 110 requests a UID, the names of one or more data files to be encrypted, and a Pswd from an intended user 135 trying to access the cryptography key management system 140 using a client mobile device 105. In some embodiments, the key management application module 110 also requests a KeyID.

The key management application module 110 then obtains a UDID of the client mobile device 105. The key management application module 110 then hashes the UDID to obtain an H(UDID) and encrypts the H(UDID) and the KeyID with the received Pswd to obtain a "{H(UDID), KeyID} Pswd".

The key management application module 110 then sends the "{H(UDID),KeyID} Pswd" and the received UID to the cryptography key management system 140 and requests a key. In some embodiments, the key management application module 110 sends the "{H(UDID),KeyID} Pswd" and the received UID to the key management server 142 and which in-turn forwards the "{H(UDID),KeyID} Pswd" and the UID to the policy engine 146. The policy engine 146 in turn passes the UID to the key access component 147 and requests a Pswd.

The cryptography key management system 140 then returns the Pswd associated with the UDID upon validating the UID. In some embodiments, the key access component 147 connects to the secure key database 150 via a valid user role, validates the UID passed by the key management application module 110 and returns the Pswd for the client mobile device 135 to the policy engine 146.

The "{H(UDID),KeyID} Pswd" is then decrypted using the Pswd associated with the UDID to obtain the H(UDID) and KeyID. In some embodiments, the policy engine 146 uses the returned Pswd and decrypts the "{H(UDID), KeyID} Pswd" to obtain the H(UDID) and KeyID. If the decryption by the policy engine 146 is successful, then the cryptography key management system 140 establishes the client mobile device 105 authentication. The policy engine 146 then passes the H(UDID) and optionally the KeyID if received from the client mobile device 105 to the key access component 147.

The Key and the KeyID are then encrypted using the Pswd to obtain an encrypted Key and an encrypted KeyID and are sent to the key management application module 110. In some embodiments, the policy engine 146 encrypts the Key and the KeyID with the Pswd, to obtain the "{Key, KeyID}Pswd" and sends the "{Key, KeyID}Pswd" to the client mobile device 105 via the key management server 142.

The encrypted Key and the KeyID are then decrypted using the Pswd to obtain the Key and the KeyID. The one or more data files are then encrypted. The encrypted one or more data files along with associated metadata are stored on the client mobile device 105. In some embodiments, the key management application module 110 receives the "{Key, KeyID}Pswd" and forwards it to the key policy engine 210 associated with the client mobile device 105. The key policy engine 210 then decrypts the "{Key, KeyID}Pswd" using the Pswd to obtain the Key and the KeyID. A server authentication is then established by the key management application module 110 upon a successful decryption. Further, the Key and the KeyID are then passed to the file access component 220 for encryption of the data files upon a successful authentication.

The size of each unencrypted data file in the one or more data files that need to be encrypted is then computed by the key management application module 110. The unencrypted data files are then encrypted using the Key and stored on the client mobile device 105. In addition, the sizes of the encrypted data files are also computed and stored on the client mobile device 105 along with the encrypted file as part of the encrypted file metadata. In some embodiments, the file access component 220 computes the size of the unencrypted data files. The file access component 220 associated with the client mobile device 105 also computes the length of the encryption key. The file access component 220 then encrypts the unencrypted data file using the Key, computes the size of the encrypted data file, and stores the encrypted data file. The Key identifier, the Key length, the size of the unencrypted data file, the original file name and associated file extension, and the date and time of last encryption are then appended as metadata to the encrypted file in plain text format.

Metadata stored along with an encrypted file can include the following information:
Key Identifier of the Key used to encrypt the file
Size of the encryption key
Size of the file before encryption
Name and extension of the original unencrypted file
Date and time of encryption
The encrypted file structure can be as shown in the table below:

| | | | File Metadata | | | | Encrypted File |
|---|---|---|---|---|---|---|---|
| Key Identifier (4-bytes) | Encryption Key Length (4-bytes) | File Size before Encryption (4-bytes) | Date and time of Encryption (18-bytes) | Length of Original Filename and extension (4-bytes) | Name and extension of original unencrypted file (n-bytes) | Length of Encrypted File Data (4 bytes) | Encrypted File Data (n-bytes) |

Figure 2:
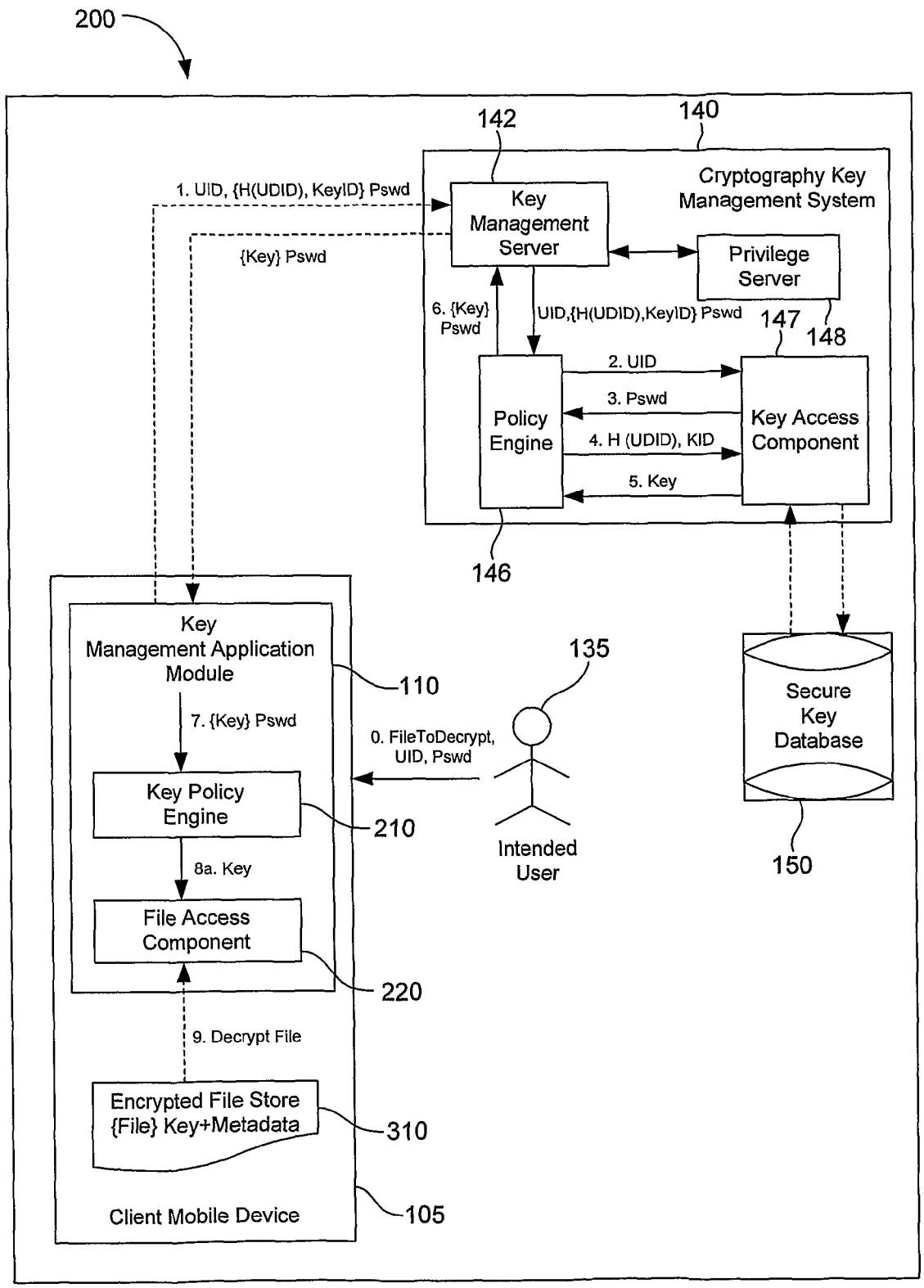
FIG. 2 is a block diagram that illustrates a mechanism used to obtain a key for decryption in an enterprise according to an embodiment of the invention.

Referring now to FIG. 2, there is shown an example embodiment that is used to obtain a key for decrypting one or more data files using a client mobile device 105. FIG. 2 is identical to the example embodiment shown in FIG. 1. In operation, as shown in FIG. 2, the key management application module 110 requests a UID, names of one or more data files to be decrypted, and a Pswd from an intended user 135.

The key management application module 110 then determines the KeyID used in decrypting the associated one or more data files using the stored associated metadata. The key management application module 110 then determines the UDID associated with the client mobile device 105. The key management application module 110 then hashes the UDID to form a H(UDID) and encrypts the H(UDID) and KeyID using the Pswd to obtain a "{H(UDID), KeyID} Pswd".

The key management application module 110 sends the "{H(UDID), KeyID} Pswd" to the cryptography key management system 140 and requests a key. In some embodiments, the key management application module 110 then sends the "{H(UDID), KeyID} Pswd" and the UID to the key management server 142. The key management server 142 then forwards the "{H(UDID), KeyID} Pswd" and the UID to the policy engine 146. The policy engine 146 then in turn passes the UID to the key access component 147 and requests a Pswd.

The cryptography key management system 140 then connects to the secure key database 150 via a valid user role upon a successful validation of the UID and returns the Pswd for the associated UID to the cryptography key management system 140. In some embodiments, the key access component connects to the secure key database 150 via the valid user role and validates that the UID passed by the key management application module 110 exists and then returns the Pswd for that associated UID to the policy engine 146.

The cryptography key management system 140 then decrypts the "{H(UDID), KeyID} Pswd" using the Pswd to obtain the H(UDID) and the Key ID. The cryptography key management system 140 then determines whether the decryption was successful. The cryptography key management system 140 then establishes a client authentication upon a successful decryption. In some embodiments, the policy engine 146 uses the returned Pswd and decrypts the "{H(UDID), KeyID} Pswd" to obtain the H(UDID) and the KeyID. If the decryption is successful, then the cryptography key management system 140 establishes a client authentication between the client mobile device 105 and the cryptography key management system 140. The policy engine 146 then passes the H(UDID) and the KeyID to the key access component 147.

The cryptography key management system 140 then retrieves the Key associated with the UDID and the KeyID. In some embodiments, the key access component 147 retrieves a Key stored for the associated H(UDID), the UID, and the KeyID combination from the secure key database 150 and returns the Key to the policy engine 146.

The cryptography key management system 140 then encrypts the Key using the Pswd to obtain a "{Key}Pswd". The cryptography key management system 140 then sends the "{Key}Pswd" to the key management application module 110. In some embodiments, the policy engine 146 encrypts the Key using the Pswd to obtain the "{Key}Pswd". The policy engine 146 then sends the "{Key}Pswd" to the key management application module 110.

The cryptography key management system 140 forwards the password-encrypted key"{Key}Pswd" to the key management application module 110 associated with the client mobile device 105. The key management application module 110 then decrypts the "{Key}Pswd" using the Pswd and obtains the Key. The key management application module 110 then determines whether decrypting of the "{Key}Pswd" was successful. If the decryption of the "{Key}Pswd" was successful, then a server authentication is established by the key management application module 110. The key management application module 110 then determines whether the server authentication was successful. If the server authentication was successful, then the key management application module 110 uses the Key for decrypting the one or more data files.

In some embodiments, the key management application module 110 receives the "{Key}Pswd" and forwards it to the key policy engine 210. The key policy engine 210 then decrypts the "{Key}Pswd" using the returned Pswd to obtain the Key. A server authentication is then established by the key management application module 110 upon successful decryption. In addition, if the authentication is successful, then the Key is used for decrypting the one or more data files. The Key is then passed to the file access component 220.

This following code is a pseudo implementation specific to a PocketPC platform. However, the design and mechanisms described above are platform agnostic and can be implemented on any other standard platform and device.

Creation of Private Exponent One Key

The keys for an RSA algorithm generally have two parts. The first part is referred to as a modulus. A modulus is a 512-bit number (64 bytes) and is the product of two 256-bit primes. The modulus is the same for both the public and the private keys. The second part of an RSA key is referred to as an exponent. This is a number of variable lengths, with the exponent of the public key usually being the smaller of the two. The two exponents, the public and the private, are related in a mathematical way, but determining one exponent from the other is hard without knowing the primes.

Essentially, with the RSA encryption, the plaintext viewed as a binary number, is raised to the power of the public exponent, and the remainder after dividing by the modulus is the ciphertext. To decrypt, the ciphertext is raised to the power of the private exponent, and the remainder after dividing by the modulus is the plaintext again. In Exponent one keys, the exponent part of the public and private RSA keys is set to 1. Because the key exponent is one, both the encryption and decryption do not affect the plain text, and thus essentially leave the data in plain text.

The exponent one key pair needs to be generated to export the encryption/decryption key in a PLAIN TEXT BLOB format. The following illustrates an example source code that can be used to create a private exponent one key:

```
BOOL CreatePrivateExponentOneKey(LPTSTR szProvider,
                DWORD dwProvType,
                LPTSTR szContainer,
                DWORD dwKeySpec,
                HCRYPTPROV *hProv,
                HCRYPTKEY *hPrivateKey)
{
  BOOL bReturn = FALSE;
  BOOL bResult = FALSE;
  int n;
  PBYTE pbkeyblob = NULL;
  DWORD dwkeyblob;
  DWORD dwBitLen;
  BYTE *ptr;
  __try
  {
    *hProv = 0;
    *hPrivateKey = 0;
    if ((dwKeySpec != AT_KEYEXCHANGE) && (dwKeySpec != AT_SIGNATURE)) __leave;
    // Try to create new container
    bResult = CryptAcquireContext(hProv, szContainer, szProvider,
                dwProvType, CRYPT_NEWKEYSET);
    if (!bResult)
    {
      // If the container exists, open it
      if (GetLastError( ) == NTE_EXISTS)
      {
        bResult = CryptAcquireContext(hProv, szContainer,
szProvider, dwProvType, 0);
        if (!bResult)
        {
          // No good, leave
          __leave;
        }
      }
      else
      {
        // No good, leave
        __leave;
      }
    }
    // Generate the private key
    bResult = CryptGenKey(*hProv, dwKeySpec,
CRYPT_EXPORTABLE, hPrivateKey);
    if (!bResult) __leave;
    // Export the private key, we'll convert it to a private
    // exponent of one key
    bResult = CryptExportKey(*hPrivateKey, 0, PRIVATEKEYBLOB,
0, NULL, &dwkeyblob);
    if (!bResult) __leave;
    pbkeyblob = (PBYTE)LocalAlloc(LPTR, dwkeyblob);
    if (!pbkeyblob) __leave;
    bResult = CryptExportKey(*hPrivateKey, 0, PRIVATEKEYBLOB, 0,
pbkeyblob, &dwkeyblob);
    if (!bResult) __leave;
    CryptDestroyKey(*hPrivateKey);
    *hPrivateKey = 0;
    // Get the bit length of the key
    memcpy(&dwBitLen, &pbkeyblob[12], 4);
    // Modify the Exponent in Key BLOB format
    // Key BLOB format is documented in SDK
    // Convert pubexp in rsapubkey to 1
    ptr = &pbkeyblob[16];
    for (n = 0; n < 4; n++)
    {
      if (n == 0) ptr[n] = 1;
      else ptr[n] = 0;
    }
    // Skip pubexp
    ptr += 4;
    // Skip modulus, prime1, prime2
    ptr += (dwBitLen/8);
    ptr += (dwBitLen/16);
    ptr += (dwBitLen/16);
    // Convert exponent1 to 1
    for (n = 0; n < (dwBitLen/16); n++)
    {
      if (n == 0) ptr[n] = 1;
      else ptr[n] = 0;
    }
    // Skip exponent1
    ptr += (dwBitLen/16);
    // Convert exponent2 to 1
    for (n = 0; n < (dwBitLen/16); n++)
    {
      if (n == 0) ptr[n] = 1;
      else ptr[n] = 0;
    }
    // Skip exponent2, coefficient
    ptr += (dwBitLen/16);
    ptr += (dwBitLen/16);
    // Convert privateExponent to 1
    for (n = 0; n < (dwBitLen/8); n++)
    {
      if (n == 0) ptr[n] = 1;
      else ptr[n] = 0;
    }
    // Import the exponent-of-one private key.
    if (!CryptImportKey(*hProv, pbkeyblob, dwkeyblob, 0, 0,
hPrivateKey))
    {
      __leave;
    }
    bReturn = TRUE;
  }
  __finally
  {
    if (pbkeyblob) LocalFree(pbkeyblob);
    if (!bReturn)
    {
      if (*hPrivateKey) CryptDestroyKey(*hPrivateKey);
      if (*hProv) CryptReleaseContext(*hProv, 0);
    }
  }
  return bReturn;
}
```

The following illustrates an example source code that can be used to generate a random session key:

```
BOOL GenerateRandomSessionKey(HCRYPTPROV hProv,
ALG_ID Alg,
                         HCRYPTKEY *hSessionKey)
{
  BOOL bResult;
  *hSessionKey = 0;
  bResult = CryptGenKey(hProv, Alg, CRYPT_EXPORTABLE,
hSessionKey);
  if (!bResult)
  {
    return FALSE;
  }
  return TRUE;
}
```

The following illustrates an example source code that can be used to derive a session key from a password:

```
BOOL GenerateSessionKeyFromPassword(HCRYPTPROV hProv,
                ALG_ID Alg,
                PBYTE lpHashingData,
                DWORD dwHashingData,
                HCRYPTKEY *hSessionKey)
{
  BOOL bResult;
  BOOL bReturn = FALSE;
  HCRYPTHASH hHash = 0;
  _try
  {
    *hSessionKey = 0;
    bResult = CryptCreateHash(hProv, CALG_SHA1, 0, 0, &hHash);
    if (!bResult) _leave;
    bResult = CryptHashData(hHash, lpHashingData,
dwHashingData, 0);
    if (!bResult) _leave;
    bResult = CryptDeriveKey(hProv, Alg, hHash,
CRYPT_EXPORTABLE, hSessionKey);
    if (!bResult) _leave;
    bReturn = TRUE;
  }
  _finally
  {
    if (hHash) CryptDestroyHash(hHash);
  }
  return bReturn;
}
```

The following illustrates an example source code that can be used to export a session key in a plain blob format:

```
//We use the above derived "exponent one Key" to export the
session key to a plain blob //format.
BOOL ExportPlainSessionBlob(HCRYPTKEY hPublicKey,
                HCRYPTKEY hSessionKey,
                PBYTE *pbKeyMaterial,
                DWORD *dwKeyMaterial )
{
  BOOL bReturn = FALSE;
  BOOL bResult;
  DWORD dwSize, n;
  PBYTE pbSessionBlob = NULL;
  DWORD dwSessionBlob;
  PBYTE pbPtr;
  _try
  {
    *pbKeyMaterial  = NULL;
    *dwKeyMaterial  = 0;
    bResult = CryptExportKey(hSessionKey, hPublicKey,
SIMPLEBLOB,
                  0, NULL, &dwSessionBlob );
    if (!bResult) _leave;
    pbSessionBlob = (PBYTE)LocalAlloc(LPTR, dwSessionBlob );
    if (!pbSessionBlob) _leave;
    bResult = CryptExportKey(hSessionKey, hPublicKey,
SIMPLEBLOB,
                  0, pbSessionBlob, &dwSessionBlob
);
    if (!bResult) _leave;
    // Get session key size in bits
    dwSize = sizeof(DWORD);
  bResult = CryptGetKeyParam(hSessionKey, KP_KEYLEN,
(PBYTE)dwKeyMaterial, &dwSize,
0);
    if (!bResult) _leave;
    // Get the number of bytes and allocate buffer
    *dwKeyMaterial /= 8;
    *pbKeyMaterial = (PBYTE)LocalAlloc(LPTR, *dwKeyMaterial);
    if (!*pbKeyMaterial) _leave;
    // Skip the header
    pbPtr = pbSessionBlob;
    pbPtr += sizeof(BLOBHEADER);
    pbPtr += sizeof(ALG_ID);
    // We are at the beginning of the key
    // but we need to start at the end since
    // it's reversed
    pbPtr += (*dwKeyMaterial − 1);
    // Copy the raw key into our return buffer
    for (n = 0; n < *dwKeyMaterial; n++)
    {
      (*pbKeyMaterial)[n] = *pbPtr;
      pbPtr−−;
    }
    bReturn = TRUE;
  }
  _finally
  {
    if (pbSessionBlob) LocalFree(pbSessionBlob);
    if ((!bReturn) && (*pbKeyMaterial ))
    {
      LocalFree(*pbKeyMaterial );
      *pbKeyMaterial  = NULL;
      *dwKeyMaterial  = 0;
    }
  }
  return bReturn;
}
```

The following illustrates an example source code that can be used to import a session key from plain blob format:

```
BOOL ImportPlainSessionBlob(HCRYPTPROV hProv,
                HCRYPTKEY hPrivateKey,
                ALG_ID dwAlgId,
                PBYTE pbKeyMaterial,
                DWORD dwKeyMaterial,
                HCRYPTKEY *hSessionKey)
{
  BOOL bResult;
  BOOL bReturn = FALSE;
  BOOL fFound = FALSE;
  PBYTE pbSessionBlob = NULL;
  DWORD dwSessionBlob, dwSize, n;
  DWORD dwPublicKeySize;
  DWORD dwProvSessionKeySize;
  ALG_ID dwPrivKeyAlg;
  PBYTE pbPtr;
  DWORD dwFlags = CRYPT_FIRST;
  PROV_ENUMALGS_EX ProvEnum;
  HCRYPTKEY hTempKey = 0;
  _try
  {
    // Double check to see if this provider supports this
algorithm
    // and key size
    do
```

```
    {
        dwSize = sizeof(ProvEnum);
        bResult = CryptGetProvParam(hProv, PP_ENUMALGS_EX,
(PBYTE)&ProvEnum,
                        &dwSize, dwFlags);
        if (!bResult) break;
        dwFlags = 0;
        if (ProvEnum.aiAlgid == dwAlgId) fFound = TRUE;
    } while (!fFound);
    if (!fFound) __leave;
    // We have to get the key size(including padding)
    // from an HCRYPTKEY handle. PP_ENUMALGS_EX contains
    // the key size without the padding so we can't use it.
    bResult = CryptGenKey(hProv, dwAlgId, 0, &hTempKey);
    if (!bResult) __leave;
    dwSize = sizeof(DWORD);
    bResult = CryptGetKeyParam(hTempKey, KP_KEYLEN,
(PBYTE)&dwProvSessionKeySize,
                        &dwSize, 0);
    if (!bResult) __leave;
    CryptDestroyKey(hTempKey);
    hTempKey = 0;
    // Our key is too big, leave
    if ((dwKeyMaterial * 8) > dwProvSessionKeySize) __leave;
    // Get private key's algorithm
    dwSize = sizeof(ALG_ID);
    bResult = CryptGetKeyParam(hPrivateKey, KP_ALGID,
(PBYTE)&dwPrivKeyAlg, &dwSize,
0);
    if (!bResult) __leave;
    // Get private key's length in bits
    dwSize = sizeof(DWORD);
    bResult = CryptGetKeyParam(hPrivateKey, KP_KEYLEN,
(PBYTE)&dwPublicKeySize,
&dwSize, 0);
    if (!bResult) __leave;
    // calculate Simple blob's length
    dwSessionBlob = (dwPublicKeySize/8) + sizeof(ALG_ID) +
sizeof(BLOBHEADER);
    // allocate simple blob buffer
    pbSessionBlob = (PBYTE)LocalAlloc(LPTR, dwSessionBlob);
    if (!pbSessionBlob) __leave;
    pbPtr = pbSessionBlob;
    // SIMPLEBLOB Format is documented in SDK
    // Copy header to buffer
    ((BLOBHEADER *)pbPtr)->bType = SIMPLEBLOB;
    ((BLOBHEADER *)pbPtr)->bVersion = 2;
    ((BLOBHEADER *)pbPtr)->reserved = 0;
    ((BLOBHEADER *)pbPtr)->aiKeyAlg = dwAlgId;
    pbPtr += sizeof(BLOBHEADER);
    // Copy private key algorithm to buffer
    *((DWORD *)pbPtr) = dwPrivKeyAlg;
    pbPtr += sizeof(ALG_ID);
    // Place the key material in reverse order
    for (n = 0; n < dwKeyMaterial; n++)
    {
        pbPtr[n] = pbKeyMaterial[dwKeyMaterial-n-1];
    }
    // 3 is for the first reserved byte after the key material +
the 2 reserved bytes
    // at the end.
    dwSize = dwSessionBlob - (sizeof(ALG_ID) +
sizeof(BLOBHEADER) + dwKeyMaterial + 3);
    pbPtr += (dwKeyMaterial+1);
    // Generate random data for the rest of the buffer
    // (except that last two bytes)
    bResult = CryptGenRandom(hProv, dwSize, pbPtr);
    if (!bResult) __leave;
    for (n = 0; n < dwSize; n++)
    {
        if (pbPtr[n] == 0) pbPtr[n] = 1;
    }
    pbSessionBlob[dwSessionBlob - 2] = 2;
    bResult = CryptImportKey(hProv, pbSessionBlob,
dwSessionBlob,
                        hPrivateKey,CRYPT_EXPORTABLE,
hSessionKey);
    if (!bResult) __leave;
    bReturn = TRUE;
    }
    __finally
    {
        if (hTempKey) CryptDestroyKey(hTempKey);
        if (pbSessionBlob) LocalFree(pbSessionBlob);
    }
    return bReturn;
}
```

The following illustrates an example source code to encrypt a file:

```
BOOL EncryptFile(LPCTSTR lpInFileName, LPCTSTR
lpOutFileName,PBYTE szPassword)
{
    HANDLE          hInFile, hOutFile;
    BOOL            finished, bResult;
    HCRYPTPROV      hProv = 0;
    HCRYPTKEY       hKey        = 0, hExchangeKey = 0;//, hKey1 = 0;
    HCRYPTHASH      hHash = 0;
    DWORD           dwByteCount, dwBytesWritten;
    DWORD dwHashingData = 0;
    PBYTE pbBuffer    = NULL;
    // Get handle for the default provider.
    bResult = CryptAcquireContext(
                    &hProv,
                    L"TestContainer1",
                    MS_ENHANCED_PROV,
                    PROV_RSA_FULL,
                    0);
    if(bResult == FALSE)
    {
        Error(TEXT("Error in Acquiring Context in Outside
Create!"));
        bResult = CryptAcquireContext(
                    &hProv,             //variable to hold
returned handle
                    L"TestContainer1",//use named key container
                    MS_ENHANCED_PROV,       //use named CSP
                    PROV_RSA_FULL,      //type of provider to acquire
                    CRYPT_NEWKEYSET    //create new key container
                    );
```

```
            if(bResult == FALSE)
            {
                    Error(TEXT("Error in Acquiring Context in
Create!"));
                    exit(0);
            }
    }
    //retrieve the exchange key
    bResult = CreatePrivateExponentOneKey(MS_ENHANCED_PROV,
PROV_RSA_FULL,
                                        L"TestContainer1",
AT_KEYEXCHANGE,
                                        &hProv,
&hExchangeKey);
    if (bResult == FALSE)
    {
        Error(TEXT(CreatePrivateExponentOneKey failed ));
            exit(0);
    }
    //--------------------------------------------------------
-----------
    // Generate a session key.
    if(szPassword != NULL)
    {
        //--------------------------------------------------
----------------
        // Create a key from password.
        bResult = GenerateSessionKeyFromPassword(hProv,
                            CALG_3DES,
                            szPassword,
                            dwHashingData,
                            &hKey);
    }
    else
    {
        //--------------------------------------------------
----------------
        // Generate a random key.
        bResult = GenerateRandomSessionKey(hProv,
                            CALG_3DES,
                            &hKey);
    }
    //create an exportable key blob with a call to
CryptExportKey
    //the key blob is an encrypted version of our encryption
key
    // The first call to ExportKey with NULL gets the key size.
    dwByteCount=0;//hExchangeKey, PLAINTEXTKEYBLOB
    bResult = ExportPlainSessionBlob(hExchangeKey, hKey,
                            &pbBuffer, &dwByteCount
);
    if (bResult == FALSE)
    {
            Error(TEXT("export session blob failed"));
        exit(0);
    }
    // Open infile and create outfile.
hInFile = CreateFile(lpInFileName, GENERIC_READ, FILE_SHARE_READ,
        NULL, OPEN_EXISTING, FILE_ATTRIBUTE_NORMAL, NULL);
hOutFile = CreateFile(lpOutFileName, GENERIC_WRITE,
FILE_SHARE_READ,
        NULL, CREATE_ALWAYS, FILE_ATTRIBUTE_NORMAL, NULL);
    // Write size of key blob, then key blob itself, to output
file.
bResult = WriteFile(hOutFile, &dwByteCount, sizeof(dwByteCount),
                &dwBytesWritten, NULL);
    if(bResult == FALSE)
    {
                    Error(TEXT("error writing blob size"));
                    exit(0);
    }
        CryptReleaseContext(hProv, 0);
        }
    return 0;
}
```

The following illustrates an example source code that can be used to decrypt a file:

```
BOOL DecryptFile(LPCTSTR lpInFileName, LPCTSTR lpOutFileName)
{
    HANDLE       hInFile, hOutFile;
    BOOL         finished, bResult;
    HCRYPTPROV   hProv = 0;
    HCRYPTKEY    hKey    = 0, hExchangeKey = 0;//, hKey1 = 0;
    HCRYPTHASH   hHash = 0;
    DWORD        dwByteCount, dwBytesWritten;
    PBYTE pbBuffer  = NULL;
    BYTE pbOutBuffer[OUT_BUFFER_SIZE];
    //Get handle for the default provider.
    bResult = CryptAcquireContext(
                    &hProv,
                    L"TestContainer1",
                    MS_ENHANCED_PROV,
                    PROV_RSA_FULL,
                    0);
    if(bResult == FALSE)
    {
        Error(TEXT("Error in Acquiring Context in Outside Create!"));
        bResult = CryptAcquireContext(
            &hProv,     //variable to hold returned handle
                    L"TestContainer1",//use named key container
                    MS_ENHANCED_PROV,       //use named CSP
                    PROV_RSA_FULL,        //type of provider to acquire
                    CRYPT_NEWKEYSET    //create new key container
                    );
        if(bResult == FALSE)
        {
            Error(TEXT("Error in Acquiring Context in Create!"));
            exit(0);
        }
    }
    //retrieve the exchange key
    bResult = CreatePrivateExponentOneKey(MS_ENHANCED_PROV, PROV_RSA_FULL,
                            L"TestContainer1",
AT_KEYEXCHANGE,
                            &hProv,
&hExchangeKey);
    if (bResult == FALSE)
    {
        Error(TEXT("CreatePrivateExponentOneKey failed));
        exit(0);
    }
    hInFile = CreateFile(lpInFileName, GENERIC_READ,
FILE_SHARE_READ,
        NULL, OPEN_EXISTING, FILE_ATTRIBUTE_NORMAL, NULL);
    hOutFile = CreateFile(lpOutFileName, GENERIC_WRITE,
FILE_SHARE_READ,
        NULL, CREATE_ALWAYS, FILE_ATTRIBUTE_NORMAL, NULL);
    // Read in key blob size, then key blob itself from input
file.
    ReadFile(hInFile,&dwByteCount,sizeof(dwByteCount),
        &dwBytesWritten,NULL);
    pbBuffer = (BYTE*)malloc(dwByteCount);
    ReadFile(hInFile, pbBuffer, dwByteCount, &dwBytesWritten,
NULL);
    // Import Key blob into "CSP"
    //i.e. we convert the key blob back into a key
//hExchangeKey
 bResult = ImportPlainSessionBlob(hProv, hExchangeKey, CALG_3DES,
pbBuffer, dwByteCount, &hKey);
    if(bResult == FALSE)
    {
      Error(TEXT("import session key failed"));
        exit(0);
        }
    // WriteFile(hOutFile,
pbBuffer,dwByteCount,&dwBytesWritten,NULL);
    // Read data in, decrypt it, and write decrypted data to
output file.
    do
    {
        ReadFile(hInFile, pbOutBuffer, IN_BUFFER_SIZE,
```

```
                &dwByteCount,NULL);
        finished = (dwByteCount < IN_BUFFER_SIZE);
            bResult = CryptDecrypt(hKey, 0, finished, 0,
pbOutBuffer, &dwByteCount);
        bResult = GetLastError( );
        if(bResult == FALSE)
        {
            Error(TEXT("decryption failed"));
        }
        WriteFile(hOutFile,
pbOutBuffer,dwByteCount,&dwBytesWritten,NULL);
} while (!finished);
    //clean up
CloseHandle(hInFile);
CloseHandle(hOutFile);
    if (pbBuffer ) free(pbBuffer );
    if (hKey) CryptDestroyKey(hKey);
if (hExchangeKey) CryptDestroyKey(hExchangeKey);
if (hProv)
    {
        CryptReleaseContext(hProv, 0);
    }
    return 0;
}
```

The following illustrates an example source code that can be used to generate a key identifier by hashing a UDID and a plain text key blob:

The hash of the UDID and the plain text key blob could act as a unique key identifier.

```
BOOL GenerateUniqueKeyID(LPCWSTR szDestination,
        LPCWSTR szdata)
{
// Declare and initialize local variables.
FILE *hDestination;
HCRYPTPROV hCryptProv;
HCRYPTHASH hHash;
PBYTE pbHash;
DWORD dwHashLen;
DWORD dwCount;
BOOL bStatus = FALSE;
// Open the destination file.
if(!(hDestination = _wfopen(szDestination,L"wb")))
{
    Error("Error opening plaintext file!");
}
// Get a handle to the default provider.
if(!CryptAcquireContext(
        &hCryptProv,
        L"TestContainer1",
        MS_ENHANCED_PROV,
        PROV_RSA_FULL,
        0))
{
    Error("Error during CryptAcquireContext!");
}
// Create a hash object.
if(!CryptCreateHash(
        hCryptProv,
        CALG_MD5,
        0,
        0,
        &hHash))
{
    Error("Error during CryptCreateHash!");
}
// Hash in the password data.
if(!CryptHashData(
        hHash,
        (PBYTE)szdata,
        wcslen(szdata),
        0))
{
    Error("Error during CryptHashData!");
}
// Read the hash value size and allocate memory.
dwCount = sizeof(DWORD);
if(!CryptGetHashParam(hHash,
    HP_HASHSIZE, (BYTE *)&dwHashLen,
        &dwCount, 0))
{
    Error("Error %x during reading hash size!");
}
if((pbHash = (PBYTE)malloc(dwHashLen)) == NULL)
{
    Error("Out of memory!");
}
// Read the hash value.
if(!CryptGetHashParam(hHash, HP_HASHVAL, pbHash,
&dwHashLen, 0))
{
    Error("Error %x during reading hash value!");
}
// Write data to destination file.
fwrite(
    pbHash,
    dwHashLen,
    dwCount,
    hDestination);
if(ferror(hDestination))
{
    Error("Error writing plaintext!");
}
bStatus = TRUE;
// Close files.
if(hDestination)
{
    if(fclose(hDestination))
        Error("Error closing destination file");
}
// Free memory.
if(pbHash)
{
    free(pbHash);
}
// Destroy the hash object.
if(!(CryptDestroyHash(hHash)))
{
    Error("Error during CryptDestroyHash");
}
hHash = 0;
// Release provider handle.
if(hCryptProv)
```

```
{
    if(!(CryptReleaseContext(hCryptProv, 0)))
        Error("Error during CryptReleaseContext");
}
return bStatus;
}
```

The following illustrates an example source code that can be used to obtain a UDID for a pocket PC 2002 device:

```
#define IOCTL_HAL_GET_DEVICEID
CTL_CODE(FILE_DEVICE_HAL, 21,
METHOD_BUFFERED, FILE_ANY_ACCESS)
CString GetSerialPPC2002Number( )
{
    DWORD dwOutBytes;
    const int nBuffSize = 4096;
    byte arrOutBuff[nBuffSize];
    BOOL bRes = ::KernelIoControl(IOCTL_HAL_GET_DEVICEID,
                    0, 0, arrOutBuff, nBuffSize,
    &dwOutBytes);
    if (bRes) {
        CString strDeviceInfo;
        for (unsigned int i = 0; i<dwOutBytes; i++) {
            CString strNextChar;
            strNextChar.Format(TEXT("%02X"), arrOutBuff[i]);
            strDeviceInfo += strNextChar;
        }
        CString strDeviceId =
            strDeviceInfo.Mid(40,2) +
            strDeviceInfo.Mid(45,9) +
            strDeviceInfo.Mid(70,6);
        return strDeviceId;
    }
    else
    {
        return _T("");
    }
}
```

The above technique addresses the security and data integrity needs of mobile devices and removable media that cache sensitive enterprise data. Further, the technique binds the decryption keys to a particular mobile device and a user. This means that the data encrypted on a particular device by a particular user can be decrypted only on that device and by that user.

Following are some examples of security threats, to encrypted data cached on the mobile device and removable media, that are addressed using the above described techniques:

If a mobile device is lost or stolen or falls in the wrong hands, the user will be prevented from decrypting the encrypted data.

If a removable media is lost or stolen or falls in the wrong hands, the user will be prevented from decrypting the data without having possession of the mobile device on which the data was originally encrypted and the correct credentials.

Any malicious intent of copying or beaming encrypted data onto a different device and trying to decrypt the data by a user will be prevented.

This technique also addresses all the basic requirements of data security in an enterprise; for example, authentication, confidentiality, integrity, authorization, non-repudiation (note that, in this context the definition of non-repudiation is limited to non-deniability), and other such data security requirements. These security requirements are addressed in the various mechanisms spelt out for key escrow and distribution. The mechanisms described above are original and are based on industry proven algorithms and security protocols. The proposed technique applies these raw technologies and concepts to address mobile device security and solutions.

In addition, the above approach provides administrative mechanisms, which can be executed only by using administrative credentials to override the general functionality of the system. These mechanisms can be typically used to recover encrypted data if a user leaves the organization, if the data is backed up in a secure location, cached on removable media, and/or the device on which the original encryption was performed is lost. Furthermore, administration or government requirements for escrow can also be addressed.

The above technique addresses computational and battery power limitations of mobile devices. The present invention does not rely on public key certificates, CA, or on the existence of PKI, which require higher computational power that is undesirable in the context of mobile devices. Moreover, the present invention relies on industry proven symmetric key mechanisms for mutual authentication, transit security, and local data encryption and decryption. The symmetric key based mechanisms require lesser processing and computational power. Also, the present invention significantly reduces usage of computing and battery resources in mobile devices.

The above-described techniques do not rely on the existence of a public key deployment. Hence they provide a cost effective solution for a large number of mobile devices in an enterprise. Further, this approach does not require manual intervention and relies on industry proven mechanisms and algorithms for security requirements. Hence, this approach is also feasible for large-scale mobile deployments.

This approach can be easily plugged into any existing security management infrastructure. It can also accommodate industry standard algorithms, protocols, and/or mechanisms. Further, the architecture provides scalability and availability. Furthermore, the approach can leverage trusted platforms for enhanced security. The mechanism of mutual authentication before transfer of keys becomes simpler with the use of trusted platforms. This is because the establishment of trust becomes simpler when the entities used in the transaction are trusted platforms. In addition, mechanisms for auditing and logging of access and activities on the enterprise are provided by trusted platform modules. Trusted platforms provide for binding data to a particular software state on the device. This can be leveraged to enhance the mechanism for binding the data to a device and a user.

This approach also addresses the needs of a general key escrow and distribution system as mentioned above. This approach provides a significant cost savings over traditional PKI based installations. Also, the proposed technique is computationally inexpensive and well suited for the processing capabilities of mobile devices. Further, the mobile device can be plugged into any existing key management infrastructure, thus enhancing the capabilities of existing installations.

Figure 3:
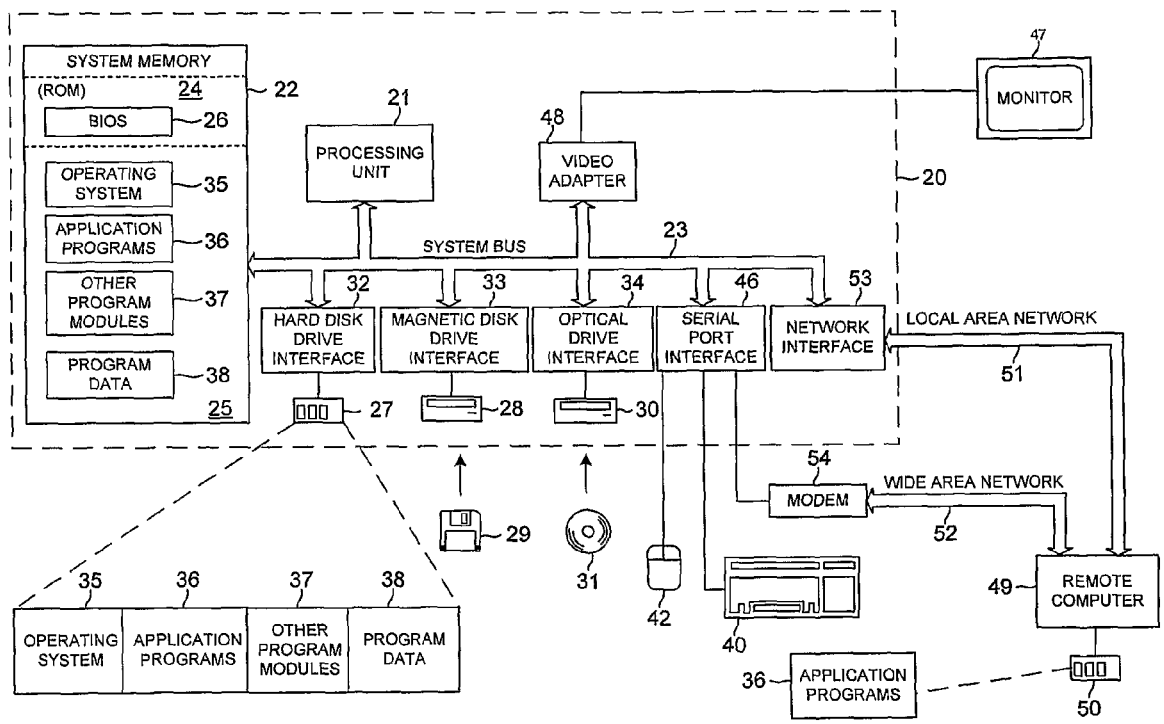
FIG. 3 is a schematic block diagram of an exemplary information-processing system that can be used in conjunction with various embodiments of the present invention, such as those in FIGS. 1 & 2.

FIG. 3 is an overview diagram of hardware and operating environment in conjunction with which various embodiments of the invention may be practiced. The description of FIG. 3 is intended to provide a brief, general description of suitable computer hardware and a suitable computing environment in conjunction with which some embodiments of the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by remote processing I/O devices that are linked through a communications network. In a distributed computing environment, program modules may be located in both local and remote memory storage devices.

In the embodiment shown in FIG. 3, a hardware and operating environment is provided that is applicable to any of the information systems and tools shown in the other Figures.

As shown in FIG. 3, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any one of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk 27, magnetic disk 29, optical disk 31, ROM 24, or RAM 25, including an operating system 35, one or more application programs 36, other program modules 37, and program data 38. For example, a cryptography key management system may be implemented as one or more program modules. For example, the one or more application programs 36 can include programs for the cryptography key management for a client mobile device as described with reference to FIGS. 1 & 2.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or a common network node, and typically includes many or all of the elements described above relative to the computer 20, although only a memory storage device 50 has been illustrated. The logical connections depicted in FIG. 8 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, which are known and understood by one of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The above-described technique provides various embodiments for authenticating a mobile device in an enterprise cryptography key management system. It is to be understood that the above-description is intended to be illustrative, and not restrictive. Many other embodiments will be apparent to those of skill in the art upon reviewing the above-description. The scope of the subject matter should, therefore, be determined with reference to the following claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the methods illustrated in FIGS. 1 & 2 can be performed in a different order from those shown and described herein.

FIGS. 1-3 are merely representational and are not drawn to scale. Certain proportions thereof may be exaggerated, while others may be minimized. FIGS. 1-3 illustrate various embodiments of the subject matter that can be understood and appropriately carried out by those of ordinary skill in the art.

What is claimed is:

1. A method comprising:
   receiving a unique user identifier (UID), names of one or more data files to be encrypted, a unique key identifier (KeyID), and a password (Pswd) from a user of a client mobile device connected to a cryptography key management system by a key management application module;
   obtaining a unique device identifier (UDID) of the client mobile device;
   obtaining a password-encrypted hash of the unique device identifier (H(UDID)) and the KeyID using the Pswd; and
   obtaining a cryptography key for encryption from the cryptography key management system using the password-encrypted H(UDID), the KeyID, and the UID.

2. A method comprising obtaining a cryptography key for encryption using a UID, a UDID, names of one or more data files to encrypt, a Pswd, and a KeyID, wherein obtaining the cryptography key for encryption using the UID, the UDID, the names of the one or more data files to encrypt, the Pswd, and the KeyID comprises:
   obtaining a password-encrypted hash of the unique device identifier (H(UDID)) and the KeyID using the Pswd by a key management application module;
   sending the password-encrypted H(UDID) and the KeyID only with the UID to a cryptography key management system by the key management application module and requesting a Pswd;
   passing the UID and requesting the stored Pswd;
   returning the Pswd associated with the UID by the cryptography key management system upon validating the UID;
   decrypting the password-encrypted H(UDID) and the KeyID using a symmetric cryptography key derived from the returned Pswd to obtain the H(UDID) and the KeyID;
   if decryption is unsuccessful, then stopping the obtaining of the cryptography key;
   if decryption is successful, then establishing a mutual authentication;
   returning the cryptography key by the cryptography key management system upon validating the H(UDID) and the KeyID;
   encrypting the cryptography key and the KeyID using the symmetric cryptography key derived from the Pswd to obtain an encrypted cryptography key and an encrypted KeyID and sending the encrypted cryptography key and the encrypted KeyID to the key management application module by the cryptography key management system;
   decrypting the encrypted cryptography key and the encrypted KeyID using the symmetric cryptography key derived from the password to obtain the data recovery key and the KeyID and encrypting the one or more data files and passing the encrypted one or more data files along with the KeyID and the associated metadata for storage; and
   computing a size of an unencrypted data file in the one or more files to be encrypted by the key management application module and encrypting the unencrypted data file using the data recovery key and storing the encrypted data file and computing a size of the encrypted data file.

3. The method of claim 2, wherein obtaining the password-encrypted H(UDID) and the KeyID using the password by the key management application module comprises:
   receiving the UID, the names of the one or more files to be encrypted, the Pswd, and the KeyID from a user of a client mobile device connected to the cryptography key management system by the key management application module;
   computing the hash of the UDID by the key management application module; and
   encrypting the H(UDID) and the KeyID using the symmetric cryptography key derived from the Pswd to obtain the password-encrypted H(UDID) and the KeyID.

4. The method of claim 2, wherein encrypting the one or more data files comprises:
   decrypting the encrypted cryptography key and the encrypted KeyID using the symmetric cryptography key derived from the password to obtain the cryptography key and the KeyID;
   determining whether the decryption of the encrypted cryptography key and the encrypted KeyID was successful;
   if the decryption was successful, then establishing a mutual authentication by the key management application module; and
   encrypting the data files using the cryptography key.

5. The method of claim 2, wherein storing the encrypted data file further comprises:
   appending as metadata to the encrypted file in plain text format using parameters selected from the group consisting of the KeyID, a key length, the size of the unencrypted data file, the name of the unencrypted data file and its associated extension, and the date and time of last encryption.

6. A method comprising:
- requesting a UID, names of the one or more data files to be decrypted, and a Pswd from an intended user via a client mobile device connected to a cryptography key management system;
- determining a KeyID from stored associated metadata to decrypt the one or more data files;
- determining a UDID associated with the client mobile device;
- hashing the UDID and encrypting the H(UDID) and the KeyID using a symmetric cryptography key derived from the Pswd to obtain a password-encrypted H(UDID) and a password-encrypted KeyID; and
- obtaining a cryptography/data recovery key for decryption by the client mobile device from the cryptography key management system using the password-encrypted H(UDID), the password-encrypted KeyID, and the UID.

7. A method comprising obtaining a cryptography/data recovery key for decryption by a client mobile device connected to a cryptography key management system using a UID, names of one or more data files to be decrypted, a Pswd, a UDID, and a KeyID, wherein obtaining the cryptography/data recovery key for decryption by the client mobile device connected to the cryptography key management system using the UID, the names of one or more data files to be decrypted, the Pswd, the UDID, and the KeyID comprises:
- requesting the UID, the names of the one or more data files to be decrypted, and the Pswd from an intended user via the client mobile device connected to the cryptography key management system;
- determining the KeyID from stored associated metadata to decrypt the one or more data files;
- determining the UDID associated with the client mobile device;
- hashing the UDID and encrypting the H(UDID) and the KeyID using a symmetric cryptography key derived from the Pswd to obtain a password-encrypted H(UDID) and a password-encrypted KeyID;
- sending the password-encrypted H(UDID), the password-encrypted KeyID, and the UID to the cryptography key management system and requesting a Pswd;
- connecting to a secure key database via a valid user role by the cryptography key management system upon successful validation of the UID and returning the Pswd for the associated UID to the cryptography key management system;
- decrypting the password-encrypted H(UDID) and the password-encrypted KeyID using the symmetric cryptography key derived from the Pswd to obtain the H(UDID) and the KeyID by the cryptography key management system;
- determining whether the decryption of the password-encrypted H(UDID) and the password-encrypted KeyID was successful;
- establishing client authentication and passing the H(UDID) and the KeyID by the cryptography key management system upon a successful client authentication;
- retrieving the cryptography/data recovery key associated with the UDID and the KeyID by the cryptography key management system;
- encrypting the cryptography/data recovery key using the symmetric cryptography key derived from the Pswd to obtain the password-encrypted key by the cryptography key management system and sending the password-encrypted key to a key management application module via the cryptography key management system;
- forwarding the password-encrypted key to the client key management application module;
- decrypting the password-encrypted key using the symmetric cryptography key derived from the Pswd by the key management application module to obtain the data recovery key;
- determining whether the decrypting of the password-encrypted key was successful;
- establishing a server authentication by the key management application module, if the decryption of the password-encrypted key was successful;
- determining whether the server authentication was successful; and
- using the cryptography/data recovery key for decrypting the one or more data files.

8. An article comprising:
a non-transitory computer readable storage medium having instructions that, when executed by a computing platform, result in execution of a method comprising:
- receiving a UID, names of one or more data files to be encrypted, a KeyID, and a Pswd from a user of a client mobile device connected to a cryptography key management system by a key management application module;
- obtaining a UDID of the client mobile device;
- obtaining a password-encrypted hash of the UDID (H(UDID)) and the KeyID using the Pswd; and
- obtaining a cryptography key for encryption from the cryptography key management system using the password-encrypted H(UDID), the KeyID, and the UID.

9. An article comprising:
a non-transitory computer readable storage medium having instructions that, when executed by a computing platform, result in execution of a method comprising:
obtaining a cryptography key for encryption using a UID, a UDID, names of one or more data files to encrypt, a Pswd, and a KeyID, wherein obtaining the cryptography key for encryption using the UID, the UDID, the names of the one or more data files to encrypt, the Pswd, and the KeyID comprises:
- obtaining a password-encrypted hash of the unique device identifier (H(UDID)) and the KeyID using the Pswd by a key management application module;
- sending the password-encrypted H(UDID) and the KeyID only with the DID to a cryptography key management system by the key management application module and requesting a Pswd;
- passing the UID and requesting the stored Pswd;
- returning the Pswd associated with the UID by the cryptography key management system upon validating the UID;
- decrypting the password-encrypted H(UDID) and the KeyID using a symmetric cryptography key derived from the returned Pswd to obtain the H(UDID) and the KeyID;
- if decryption is unsuccessful, then stopping the obtaining of the cryptography key;
- if decryption is successful, then establishing a mutual authentication;
- returning the cryptography key by the cryptography key management system upon validating the H(UDID) and the KeyID;
- encrypting the cryptography key and the KeyID using the symmetric cryptography key derived from the Pswd to obtain an encrypted cryptography key and an encrypted KeyID and sending the encrypted cryptography key and the encrypted KeyID to the key management application module by the cryptography key management system;

decrypting the encrypted cryptography key and the encrypted KeyID using the symmetric cryptography key derived from the password to obtain the data recovery key and the KeyID and encrypting the one or more data files and passing the encrypted one or more data files along with the KeyID and the associated metadata for storage; and computing a size of an unencrypted data file in the one or more files to be encrypted by the key management application module and encrypting the unencrypted data file using the data recovery key and storing the encrypted data file and computing a size of the encrypted data file.

10. The article of claim 9, wherein obtaining the password-encrypted H(UDID) and the KeyID using the password by the key management application module comprises:

receiving the UID, the names of the one or more files to be encrypted, the Pswd, and the KeyID from a user of a client mobile device connected to the cryptography key management system by the key management application module;

computing the hash of the UDID by the key management application module; and encrypting the H(UDID) and the KeyID using the symmetric cryptography key derived from the Pswd to obtain the password-encrypted H(UDID) and the KeyID.

11. The article of claim 9, wherein encrypting the one or more data files comprises:

decrypting the encrypted cryptography key and the encrypted KeyID using the symmetric cryptography key derived from the password to obtain the cryptography key and the KeyID;

determining whether the decryption of the encrypted cryptography key and the encrypted KeyID was successful;

if the decryption was successful, then establishing a mutual authentication by the key management application module; and encrypting the data files using the cryptography key.

12. The article of claim 9, wherein storing the encrypted data file further comprises:

appending as metadata to the encrypted file in plain text format using parameters selected from the group consisting of the KeyID, a key length, the size of the unencrypted data file, the name of the unencrypted data file and its associated extension, and the date and time of last encryption.

13. An article comprising:

a non-transitory computer readable storage medium having instructions that, when executed by a computing platform, result in execution of a method comprising:

requesting a UID, names of the one or more data files to be decrypted, and a Pswd from an intended user via a client mobile device connected to a cryptography key management system;

determining a KeyID from stored associated metadata to decrypt the one or more data files;

determining a UDID associated with the client mobile device;

hashing the UDID and encrypting the H(UDID) and the KeyID using a symmetric cryptography key derived from the Pswd to obtain a password-encrypted H(UDID) and a password-encrypted KeyID; and obtaining a cryptography/data recovery key for decryption by the client mobile device from the cryptography key management system using the password-encrypted H(UDID), the password-encrypted KeyID, and the UID.

14. An article comprising:

a non-transitory computer readable storage medium having instructions that, when executed by a computing platform, result in execution of a method comprising:

obtaining a cryptography/data recovery key for decryption by a client mobile device connected to a cryptography key management system using a UID, names of one or more data files to be decrypted, a Pswd, a UDID, and a KeyID, wherein obtaining the cryptography/data recovery key for decryption by the client mobile device connected to the cryptography key management system using the DID, the names of one or more data files to be decrypted, the Pswd, the UDID, and the KeyID comprises:

requesting the UID, the names of the one or more data files to be decrypted, and the Pswd from an intended user via the client mobile device connected to the cryptography key management system;

determining the KeyID from stored associated metadata to decrypt the one or more data files;

determining the UDID associated with the client mobile device;

hashing the UDID and encrypting the H(UDID) using a symmetric cryptography key derived from the Pswd to obtain a password-encrypted H(UDID) and a password-encrypted KeyID;

sending the password-encrypted H(UDID), the password-encrypted KeyID, and the UID to the cryptography key management system and requesting a Pswd;

connecting to a secure key database via a valid user role by the cryptography key management system upon successful validation of the UID and returning the Pswd for the associated UID to the cryptography key management system;

decrypting the password-encrypted H(UDID) and the password-encrypted KeyID using the symmetric cryptography key derived from the Pswd to obtain the H(UDID) and the KeyID by the cryptography key management system;

determining whether the decryption of the password-encrypted H(UDID) and the password-encrypted KeyID was successful;

establishing client authentication and passing the H(UDID) and the KeyID by the cryptography key management system upon a successful client authentication;

retrieving the cryptography/data recovery key associated with the UDID and the KeyID by the cryptography key management system;

encrypting the cryptography/data recovery key using the symmetric cryptography key derived from the Pswd to obtain the password-encrypted key by the cryptography key management system and sending the password-encrypted key to a key management application module via the cryptography key management system;

forwarding the password-encrypted key to the client key management application module;

decrypting the password-encrypted key using the symmetric cryptography key derived from the Pswd by the key management application module to obtain the data recovery key;

determining whether the decrypting of the password-encrypted key was successful;

establishing a server authentication by the key management application module, if the decryption of the password-encrypted key was successful;

determining whether the server authentication was successful; and using the cryptography/data recovery key for decrypting the one or more data files.

15. A cryptography key management apparatus, comprising:

a cryptography key management system; and a key management application module coupled to the cryptography key management system to:
  receive a UID, names of one or more data files to be encrypted, a KeyID, and a Pswd from a user of a client mobile device connected to the cryptography key management system;
  obtain a UDID of the client mobile device;
  obtain a password-encrypted hash of the UDID (H(UDID)) and the KeyID using the Pswd; and
  obtain a cryptography key for encryption from the cryptography key management system using the password-encrypted H(UDID), the KeyID, and the UID.

16. A cryptography key management apparatus, comprising:

a cryptography key management system that obtains a cryptography key for encryption using a UID, a UDID, names of one or more data files to encrypt, a Pswd, and a KeyID; and a key management application module that is coupled to the cryptography key management system, wherein the key management application module obtains a password-encrypted hash of the unique device identifier (H(UDID)) and the KeyID using the Pswd,
  wherein the key management application module sends the password-encrypted H(UDID) and the KeyID along with the UID to the cryptography key management system and requests a Pswd, wherein the cryptography key management system passes the UID and requests the Pswd, wherein the cryptography key management system returns the Pswd associated with the UID upon validating the UID, wherein the cryptography key management system decrypts the password-encrypted H(UDID) and the KeyID using a symmetric cryptography key derived from the returned Pswd to obtain the H(UDID) and the KeyID,
  wherein the cryptography key management system stops the obtaining of the cryptography key if decryption is unsuccessful, and establishes a mutual authentication if decryption is successful,
  wherein the cryptography key management system returns the cryptography key upon validating the H(UDID) and the KeyID,
  wherein the cryptography key management system encrypts the cryptography key and the KeyID using the symmetric cryptography key derived from the Pswd to obtain an encrypted cryptography key and an encrypted KeyID and sends the encrypted cryptography key and the encrypted KeyID to the key management application module,
  wherein the cryptography key management system decrypts the encrypted cryptography key and the encrypted KeyID using the symmetric cryptography key derived from the password to obtain the data recovery key and the KeyID and encrypts the one or more data files and passes the encrypted one or more data files along with the KeyID and the associated metadata for storage, and
  wherein the key management application module computes a size of an unencrypted data file in the one or more files to be encrypted and encrypts the unencrypted data file using the data recovery key and stores the encrypted data file and computes a size of the encrypted data file.

17. A cryptography key management apparatus, comprising:

a cryptography key management system; and a client mobile device coupled to the cryptography key management system to:
  request a UID, names of the one or more data files to be decrypted, and a Pswd from an intended user via a client mobile device connected to a cryptography key management system;
  determine a KeyID from stored associated metadata to decrypt the one or more data files;
  determine a UDID associated with the client mobile device;
  hashing the UDID and encrypting the H(UDID) and the KeyID using a symmetric cryptography key derived from the Pswd to obtain a password-encrypted H(UDID) and a password-encrypted KeyID; and
  obtain a cryptography/data recovery key for decryption using the password-encrypted H(UDID), the password-encrypted KeyID, and the UID.

18. A cryptography key management apparatus, comprising:

a cryptography key management system;

a client mobile device coupled to the cryptography key management system that obtains a cryptography/data recovery key for decryption using a UID, names of one or more data files to be decrypted, a Pswd, a UDID, and a KeyID;

a secure key database coupled to the cryptography key management system; and a key management application module coupled to the cryptography key management system,
  wherein the client mobile device requests the UID, the names of the one or more data files to be decrypted, and the Pswd from an intended user from the cryptography key management system,
  wherein the cryptography key management system determines the KeyID from stored associated metadata to decrypt the one or more data files, wherein the cryptography key management system determines the UDID associated with the client mobile device,
  wherein the cryptography key management system hashes the UDID and encrypting the H(UDID) using a symmetric cryptography key derived from the Pswd to obtain a password-encrypted H(UDID) and a password-encrypted KeyID,
  wherein the client mobile device sends the password-encrypted H(UDID), the password-encrypted KeyID, and the UID to the cryptography key management system and requests a Pswd,
  wherein the client mobile device connects the secure key database via a valid user role upon successful validation of the UID and returns the Pswd for the associated UID to the cryptography key management system,
  wherein the cryptography key management system decrypts the password-encrypted H(UDID) and the password-encrypted KeyID using the symmetric cryptography key derived from the Pswd to obtain the H(UDID) and the KeyID, wherein cryptography key management system determines whether the decryption of the password-encrypted H(UDID) and the password-encrypted KeyID is successful, wherein the cryptography key management system establishes a client authentication and passes the H(UDID) and the KeyID upon a successful client authentication, wherein the cryptography key management system retrieves the cryptography/data recovery key associated with the UDID and the KeyID, wherein the cryptography key management system encrypts the cryptography/data recovery key using the symmetric cryptography key derived from the Pswd to obtain the password-encrypted key and sends the password-encrypted key to the key management application module, wherein the cryptography key management system forwards the password-encrypted key to the client key management application module, wherein the key management application module decrypts the password-encrypted key using the symmetric cryptography key derived from the Pswd and obtains the data recovery key, wherein the cryptography key management system determines whether the decryption of the password-encrypted key was successful, wherein the key management application module establishes a server authentication if the decryption of the password-encrypted key was successful, wherein the cryptography key management system determines whether the server authentication was successful, and wherein the cryptography key management system uses the cryptography/data recovery key to decrypt the one or more data files.

\* \* \* \* \*